US008855408B2

(12) United States Patent
Kim et al.

(10) Patent No.: US 8,855,408 B2
(45) Date of Patent: Oct. 7, 2014

(54) METHOD AND APPARATUS FOR RECOVERING DEPTH INFORMATION OF IMAGE

(75) Inventors: Jiwon Kim, Seoul (KR); Guofeng Zhang, Zhejiang University (CN); Du Sik Park, Gyeonggi-do (KR); Ho Young Lee, Gyeonggi-do (KR); Hujun Bao, Hangzhou (CN); Wenzhuo Yang, Zhejiang University (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 283 days.

(21) Appl. No.: 13/434,117

(22) Filed: Mar. 29, 2012

(65) Prior Publication Data

US 2013/0136299 A1 May 30, 2013

(30) Foreign Application Priority Data

Nov. 30, 2011 (KR) .......................... 10-2011-0127153

(51) Int. Cl.
 *G06K 9/00* (2006.01)
(52) U.S. Cl.
 USPC ............................. 382/154; 382/100; 382/174
(58) Field of Classification Search
 None
 See application file for complete search history.

(56) References Cited

U.S. PATENT DOCUMENTS

| 2007/0031037 | A1* | 2/2007 | Blake et al. ................... 382/173 |
| 2008/0031327 | A1* | 2/2008 | Wang et al. ............. 375/240.12 |
| 2009/0141938 | A1* | 6/2009 | Lim et al. ....................... 382/103 |
| 2011/0158506 | A1* | 6/2011 | Kwon et al. .................. 382/154 |

FOREIGN PATENT DOCUMENTS

| KR | 10-2006-0063480 | 6/2006 |
| KR | 10-2008-0092353 | 10/2008 |
| KR | 10-2010-0008649 | 1/2010 |
| KR | 10-2010-0137282 | 12/2010 |

* cited by examiner

*Primary Examiner* — Hadi Akhavannik
(74) *Attorney, Agent, or Firm* — Staas & Halsey LLP

(57) ABSTRACT

An image processing apparatus and method may estimate binocular disparity maps of middle views from among a plurality of views through use of images of the plurality of views. The image processing apparatus may detect a moving object from the middle views based on the binocular disparity maps of the frames. Pixels in the middle views may be separated into dynamic pixels and static pixels through detection of the moving object. The image processing apparatus may apply bundle optimization and a local three-dimensional (3D) line model-based temporal optimization to the middle views so as to enhance binocular disparity values of the static pixels and dynamic pixels.

23 Claims, 11 Drawing Sheets
(2 of 11 Drawing Sheet(s) Filed in Color)

IMAGE OF VIEW

GENERATE BINOCULAR DISPARITY MAP AND PERFORM SPATIO-TEMPORAL OPTIMIZATION

SPATIO-TEMPORAL OPTIMIZED BINOCULAR DISPARITY MAP

FIG. 8
BINOCULAR DISPARITY MAP
↓ TEMPORAL FUSION
BINOCULAR DISPARITY MAP OBTAINED
THROUGH TEMPORAL FUSION

FIG. 10
IMAGE OF VIEW
 SEGMENTATION
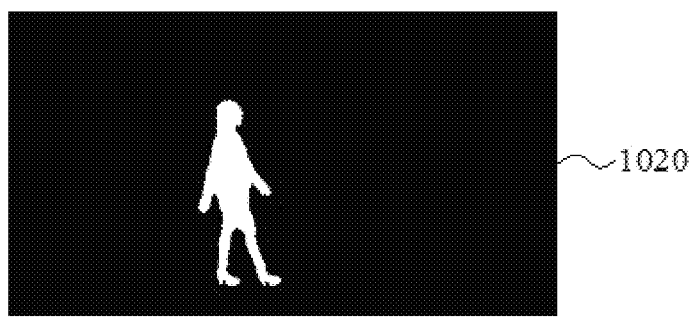
MOVING OBJECT AND BACKGROUND

IMAGE OF VIEW

GENERATE BINOCULAR
DISPARITY MAP AND
PERFORM SPATIO-TEMPORAL
OPTIMIZATION

SPATIO-TEMPORAL OPTIMIZED
BINOCULAR DISPARITY MAP

METHOD AND APPARATUS FOR RECOVERING DEPTH INFORMATION OF IMAGE

CROSS-REFERENCE TO RELATED APPLICATIONS

This application claims the priority benefit of Korean Patent Application No. 10-2011-0127153, filed on Nov. 30, 2011, in the Korean Intellectual Property Office, the disclosure of which is incorporated herein by reference.

BACKGROUND

1. Field

Example embodiments disclosed herein relate to a method and apparatus for recovering depth information of an image, and more particularly, to a method and apparatus for recovering a set of depth maps that may be spatio-temporally consistent, based on video sequences captured by a plurality of cameras.

2. Description of the Related Art

Recovering a depth image based on images or videos is a fundamental issue in the computer vision field. Recovering the depth image may be used for three-dimensional (3D) reconstruction, 3D film making, autonomous robotic navigation, video segmentation and editing, and the like.

Through stereo-matching, depth information may be recovered based on at least two multi-images for which camera parameters are known.

Approaches currently used for recovering depth information may be classified into two categories. First, several approaches may use a scheme that is local and is based on a window, and may adopt a local Winner-Takes-All strategy, when estimating a disparity. Conversely, other approaches may formulate estimation of depth as an energy-minimization issue, and may use graph cuts and belief propagation algorithms so as to solve the energy-minimization issue.

Recovered high-quality depth information may be utilized for 3D video, stereoscopic video analyzing, video editing and augmented reality, and the like.

SUMMARY

The foregoing and/or other aspects are achieved by providing a method of processing an image, the method including estimating a binocular disparity map of a middle view for each of one or more frames using a left image, a middle image, and a right image included in each of the frames, the middle view including the middle image and the estimated binocular disparity map, estimating background views indicating backgrounds of the middle views through use of depth maps of the middle views of the frames, and detecting a moving object in the middle views, based on differences between the middle views and the background views.

At least one of the left image and the right image may correspond to a plurality of images.

The estimating of the binocular disparity map may include calculating the binocular disparity map of the middle view by repeatedly minimizing a value of an energy function through use of a back propagation (BP) algorithm, the value of the energy function being determined based on occlusion information associated with the middle view and the binocular disparity map of the middle view when the left image, the middle image, and the right image are provided, and enhancing the binocular disparity map of the middle view by fusing results obtained by applying different plane fittings to the binocular disparity map of the middle view.

The calculating may include estimating the occlusion information based on the binocular disparity map of the middle view, and estimating the binocular disparity map of the middle view based on the occlusion information.

The method may further include enhancing the binocular disparity map of the middle view using information associated with an optical flow among the frames.

The estimating of the background views may include warping middle views of neighboring frames of a target frame from among the frames to match a middle view of the target frame, so as to generate candidate binocular disparity values and candidate color values of pixels included in the middle view of the target frame, and applying a median filter to the candidate binocular disparity values and the candidate color values of the pixels, so as to generate an image and a binocular disparity map of a background view of the target frame.

The detecting of the moving object may include comparing, for each pixel, the middle view and the background view of each of the frames so as to measure a difference in color, depth, and movement-depth of each pixel included in the middle views, and segmenting dynamic regions from the middle views, based on at least one of the difference in color, depth, and movement-depth of each pixel included in the middle views.

The segmented dynamic regions may correspond to the moving object.

The detecting may include enhancing a spatio-temporal consistency among the segmented dynamic regions through use of information associated with an optical flow among the frames.

The method may further include applying, to the middle views of the frames, bundle optimization and local three-dimensional (3D) line model-based temporal optimization so as to enhance binocular disparity values of static pixels and dynamic pixels included in the middle views.

The dynamic pixels may correspond to pixels corresponding to the moving object, and the static pixels may correspond to pixels that do not correspond to the moving object.

The method may further include generating binocular disparity maps of left views of the frames and binocular disparity maps of right views of the frames by warping the middle views of the frames, filling holes included in the binocular disparity maps of the left views and the binocular disparity maps of the right views, based on segmentation, and applying spatio-temporal optimization to the binocular disparity maps of the left views and the binocular disparity maps of the right views.

The holes may be created by missing pixels resulting from occlusion in the middle views.

The foregoing and/or other aspects are achieved by providing an apparatus for processing an image, the apparatus including a binocular disparity map estimator to estimate a binocular disparity map of a middle view of each of one or more frames using a left image, a middle image, and a right image included in each of the frames, the middle view including the middle image and the estimated binocular disparity map, a background view estimator to estimate background views indicating backgrounds of the middle views through use of depth maps of the middle views of the frames, and a moving object detector to detect a moving object in the middle views, based on differences between the middle views and the background views.

Additional aspects of embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of embodiments, taken in conjunction with the accompanying drawings of which:

FIG. 8 illustrates a result of temporal fusion according to example embodiments;

FIG. 10 illustrates a segmented moving object from a view according to example embodiments.

DETAILED DESCRIPTION

Figure 1:
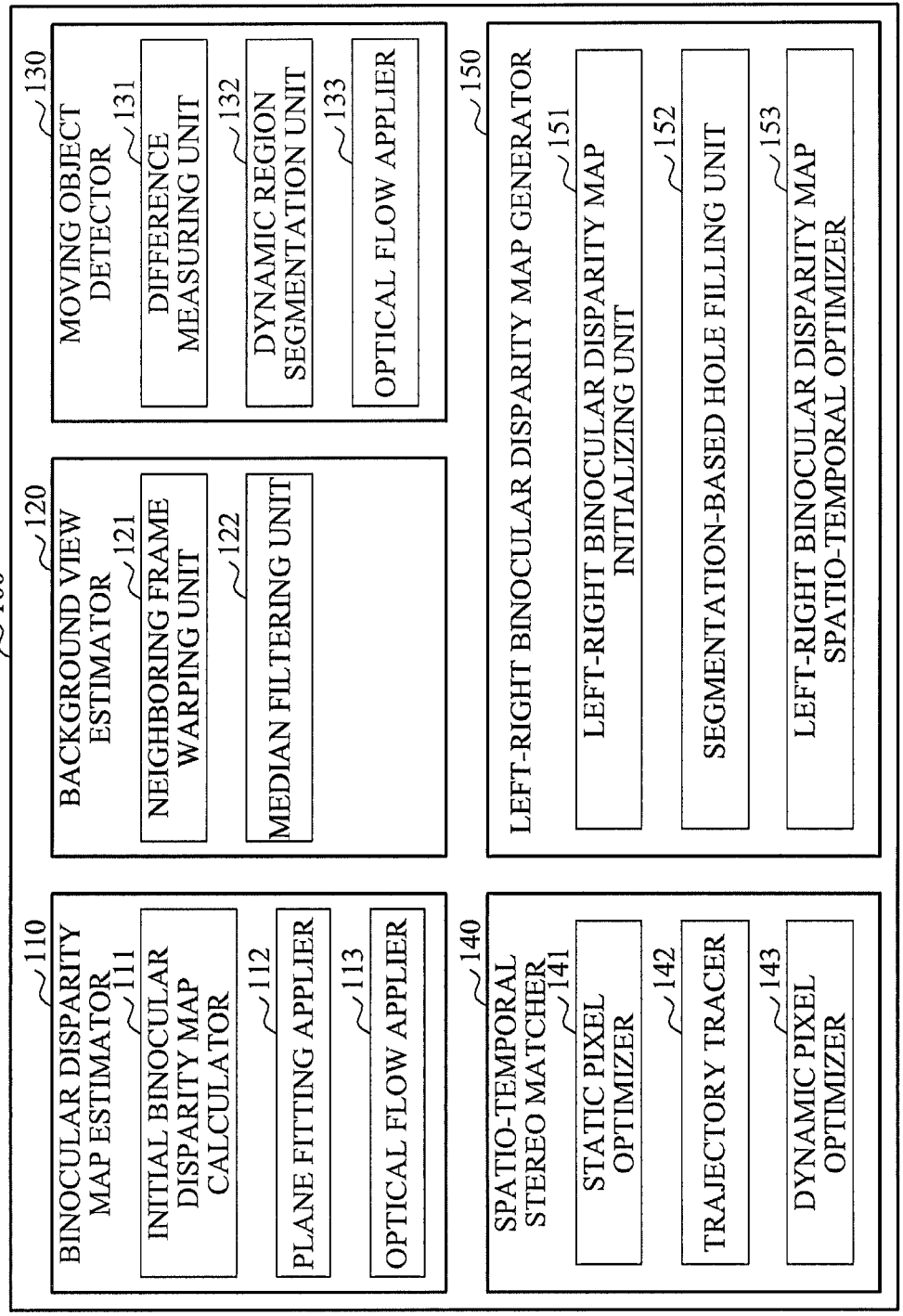
FIG. 1 illustrates an image processing apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates a block diagram of an image processing apparatus 100 according to example embodiments.

The image processing apparatus 100 may include a binocular disparity map estimator 110, a background view estimator 120, a moving object detector 130, a spatio-temporal stereo matcher 140, and a left-right binocular disparity map generator 150.

The binocular disparity map estimator 110 may include an initial binocular disparity map calculator 111, a plane fitting applier 112, and an optical flow applier 113.

The background view estimator 120 may include a neighboring frame warping unit 121 and a median filtering unit 122.

The moving object detector 130 may include a difference measuring unit 131, a dynamic region segmentation unit 132, and an optical flow applier 133.

The spatio-temporal stereo matcher 140 may include a static pixel optimizer 141, a trajectory tracer 142, and a dynamic pixel optimizer 143.

The left-right binocular disparity map generator 150 may include a left-right binocular disparity map initializing unit 151, a segmentation-based hole filling unit 152, and a left-right binocular disparity map spatio-temporal optimizer 153.

Hereinafter, operations and functions of the elements will be described.

Figure 2:
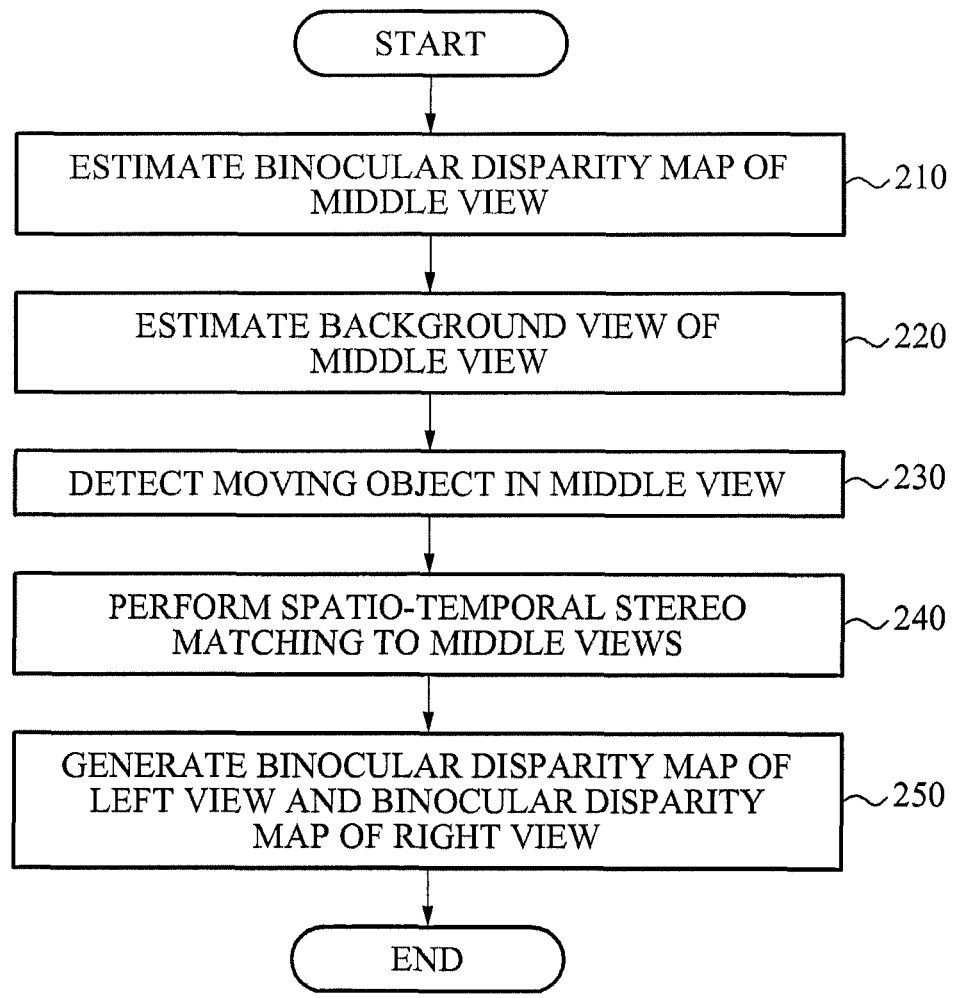
FIG. 2 illustrates an image processing method according to example embodiments.

FIG. 2 illustrates an image processing method according to example embodiments.

In operation 210, the binocular disparity map estimator 110 may estimate a binocular disparity map of a middle view for each of one or more frames through use of a left image, a middle image, and a right image included in each of the frames.

The middle view may include the middle image and the estimated binocular disparity map.

The binocular disparity map estimator 110 may independently estimate a depth map of each frame through use of trinocular views of each frame. Here, the depth map of each frame may correspond to a depth map corresponding to an image of a middle view from among the trinocular views.

In operation 220, the background view estimator 120 may estimate background views indicating backgrounds of middle views through use of depth maps of the middle views of the frames.

In operation 230, the moving object detector 130 may detect a moving object from the middle views of the frames, based on differences between middle views and the background views.

The moving object detector 130 may separate static pixels from dynamic pixels in a sequence of the middle views, by detecting the moving object. The dynamic pixels may be pixels corresponding to the moving object, and the static pixels may be pixels that do not correspond to the moving object.

To process texture-less regions, the moving object detector 130 may use a segmentation-based algorithm. The segmentation-based algorithm may be operated based on a general concept that neighboring pixels having similar colors usually have similar depth values and segments separated through segmentation may be expressed by a 3D plane.

In operation 240, the spatio-temporal stereo matcher 140 may apply bundle optimization and local 3D line model-based spatio-temporal optimization to the middle views of the frames so as to enhance binocular disparity values of the static pixels and the dynamic pixels in the middle views.

After the binocular disparity maps of the middle views are recovered, binocular disparity maps of left views and binocular disparity maps of right views may be generated.

In operation 250, the left-right binocular disparity map generator 150 may generate the binocular disparity maps of the left views and the binocular disparity maps of the right views, based on the generated binocular disparity maps of the middle views.

Figure 3:
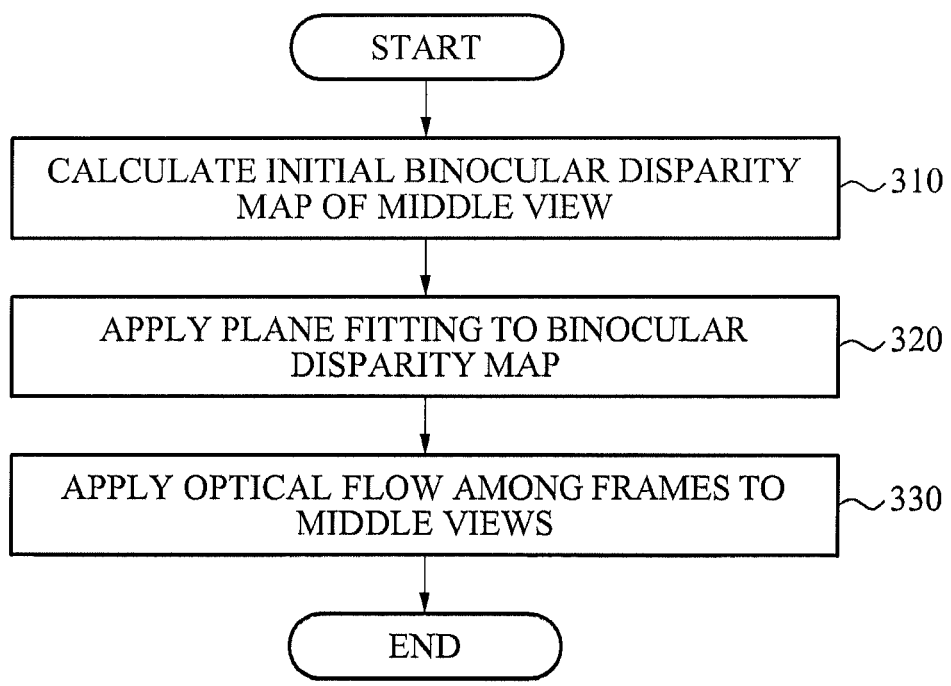
FIG. 3 illustrates a method of estimating a binocular disparity map according to example embodiments.

FIG. 3 illustrates a method of estimating a binocular disparity map according to example embodiments.

In operation 210 corresponding to estimation of a binocular disparity map, the binocular disparity map may be initialized through, for example, trinocular stereo matching. Operation 210 may include operations 310, 320, and 330.

Hereinafter, $I_L$, $I_M$, and $I_R$ denote a left image, a middle image, and a right image captured by a trinocular camera, respectively. Here, $I_L$, $I_M$ and $I_R$, three images generated or captured by the trinocular camera, may merely be examples. The present embodiment may be applicable to a frame including images. For example, $I_M$ denotes a middle image among a plurality of images. $I_L$ denotes a plurality of images on the left of $I_M$. $I_R$ denotes a plurality of images on the right of $I_M$.

Occlusion information of a middle view may be expressed by $O=\{O_L, O_R\}$. $O_L(x)=1$ may indicate that a pixel x, included in a middle image, is invisible from $I_L$. $O_R(x)=1$ may indicate that the pixel x is invisible in $I_R$.

$I_i(x)$ denotes a color of the pixel x in an image $I_i$. i may be one of L, M, and R.

D denotes a binocular disparity map of a middle view. A binocular disparity may be defined as an inverse depth. When a depth of the pixel x is z, a binocular disparity value (D(x)) of the pixel x may be 1/z. A range of a binocular disparity may be denoted by $[d_{min}, d_{max}]$.

A binocular disparity may be quantized to m+1 levels. A $k^{th}$ level ($d_k$) of the quantized binocular disparity may be defined by Equation 1.

$$d_k=(m-k)/m \cdot d_{min}+k/m \cdot d_{max} \quad \text{[Equation 1]}$$

In Equation 1, $d_{min}$, denotes a minimum level of the quantized binocular disparity, and $d_{max}$ denotes a maximum level of the quantized binocular disparity. In general, m may be set to be in a range between 50 and 80.

Accordingly, stereo matching may be formulated as a labeling problem.

In operation 310, an initial binocular disparity map calculator 111 may repeatedly minimize a value of an energy function through use of a back propagation (BP) algorithm or a fusion move algorithm, so as to calculate the binocular disparity map of the middle view. That is, the initial binocular disparity map calculator 111 may minimize an energy function E (D, O; I) of FIG. 2, so as to solve the binocular disparity map D of the middle view. The binocular disparity map of the middle view generated first in operation 310 may be referred to as an initial binocular disparity map of the middle view.

$$E(D,O;I)=E_d(D,O;I)+E_s(D,O;I)+E_v(D,O;I) \quad \text{[Equation 2]}$$

In Equation 2, I denotes images, that is, $I_L$, $I_M$, and $I_R$. E denotes an energy function, $E_d$ denotes a data term, $E_s$ denotes a smoothness term, and $E_v$ denotes a visibility term. $E_d$ may measure a fitness of a binocular disparity D with respect to a given I. $E_s$ describes a smoothness assumption with respect to a binocular disparity D. To solve a multi-labeling equation, the initial binocular disparity map calculator 111 may use a belief propagation or a graph cut.

As shown in Equation 2, a value of the energy function E(D, O; I) may be determined based on an occlusion information O associated with the middle view and the binocular disparity map D of the middle view when $I_L$, $I_M$ and $I_R$ are provided.

$E_d$ may be defined by Equation 3.

$$E_d(D, O; I) = \sum_x (1 - O_L(x))(1 + O_R(x))\rho_d(F(x, d_x; I_L, I_M)) + \sum_x (1 - O_R(x))(1 + O_L(x))\rho_d(F(x, d_x; I_R, I_M)) + \sum_x O_L(x)O_R(x)\eta \quad \text{[Equation 3]}$$

In Equation 3, F denotes a cost function. $\eta$ denotes a penalty parameter.

$\rho_d$ may be a truncated $L_1$ norm function that is robust to noise. $\rho_d$ may be defined by Equation 4.

$$\rho_d=-\ln((1-e_d)\exp(-|x|/\delta)+e_d \quad \text{[Equation 4]}$$

In Equation 4, $e_d$ and $\delta$ may be parameters to control a shape of $\rho_d$.

As shown in Equation 5, F, that is, a cost function, may be defined as a sum of squared differences (SSD) color difference cost.

$$F(x,d,I)=\|I_1(x)-I_2(I_{1->2}(x,d))\|_2 \quad \text{[Equation 5]}$$

$I_1$ denotes an image before projection, that is, $I_M$. $I_2$ denotes an image after projection, that is, $I_L$ or $I_R$. $I_i(x)$ denotes a color value of a pixel x of an image $I_i$. $I_{1->2}$ denotes a pixel projected in a left image or a right image with a binocular disparity d for the pixel x in the middle image.

$E_s$ is defined by Equation 6.

$$E_s(D) = \sum_{s,t \in C} \lambda(s, t)\rho_s(d_s, d_t) \quad \text{[Equation 6]}$$

In Equation 6, S,t∈C indicates that a pixel s and a pixel t are neighbors. That is, (s, t) denotes a pair of adjacent pixels in a middle frame. C denotes a set.

A cost ($\rho_s$) with respect to $d_s$ and $d_t$ may be selected as shown by Equation 7.

$$\rho_s(d_s,d_t)=\min\{|d_s-d_t|,T\} \quad \text{[Equation 7]}$$

In Equation 7, T denotes a parameter to control a limit of a cost.

An adaptive smoothness weight ($\lambda(s,t)$) with respect to the pixel x and the pixel t may be defined by Equation 8.

$$\lambda(s, t) = \beta \frac{u(s)}{\|I(s) - I(t)\| + \varepsilon} \quad \text{[Equation 8]}$$

In Equation 8, $\beta$ denotes a parameter to control a weight of a smoothness term. $\varepsilon$ denotes a parameter to control a sensitivity for a color difference. u(s) denotes a normalization factor. u(s) may be defined by Equation 9.

$$u(s) = |N(s)|/\sum_{t \in N(s)} \frac{1}{\|I(s) - I(t)\| + \varepsilon} \quad \text{[Equation 9]}$$

In Equation 9, N(s) denotes a set of pixels adjacent to the pixel s.

To enforce a visibility consistency constraint, $E_v$ may be defined by Equation 10.

$$E_v(D, O; I) = \sum_s \beta_\omega |O(s) - W(s; D)| + \sum_{s,t \in N} \beta_o |O(s) - O(t)| \quad \text{[Equation 10]}$$

In Equation 10, $\beta_\omega$, w(x), and $\beta_o$ may be parameters used for calculating $E_v$. $\beta_\omega$ may be a parameter indicating a penalty for a case where a pixel is set to be disoccluded although the pixel cannot be visible. $\beta_o$ may be a parameter indicating a penalty for a case where a few pixels are occluded and remaining pixels are disoccluded among adjacent pixels.

Here, the binocular disparity map to be calculated may merely be a binocular disparity map of a middle view. Considering a left view and a middle view as an example, a visibility term may be defined by Equation 11.

$$E_v(D, O_L; I_L, I_M) = \sum_s \beta_\omega |O_L(s) - W_L(s; D)| + \sum_{s,t \in N} \beta_o |O_L(s) - O_L(t)| \quad \text{[Equation 11]}$$

In Equation 11, $O_L(x)$ denotes occlusion information associated with a left view. $O_L(x)=1$ indicates that a pixel x is invisible in the left view. $O_L(x)=0$ indicates that the pixel x is visible in the left view. $W_L(s; D)$ denotes initial occlusion information. $W_L(s; D)$ may be obtained based on Equation 12.

$$W_L(s; D) = \begin{cases} 1, & \text{if } \exists t \in I, \\ & d(s, d_s) = d(t, d_t) \wedge d_s < d_t \wedge f(s) \neq f(t) \\ 0, & \text{otherwise} \end{cases} \quad \text{[Equation 12]}$$

Equation 12 is directed to a segmentation-based method for handling occlusion. Equation 12 shows the pixel s is occluded. When a pixel t in an image I satisfies a condition that the pixel t and the pixel s exist on different planes, a condition that a point corresponding to the pixel s and a point corresponding to the pixel t are identical in different views, for example, $I_L$ and $I_R$ when $I=I_M$, and a condition of $d_s<d_t$, the pixel s may be occluded by the pixel t.

To obtain a better result, the initial binocular disparity map calculator 111 may use an algorithm that repeatedly calculates a value of a visibility map and a binocular disparity map, when handling occlusion. The algorithm may be an effective method that accurately estimates binocular disparity information and reduces an effect from occlusion.

As described in the foregoing, the initial binocular disparity map calculator 111 may acquire a value of the energy function $E(D, O; I)$ through an iterative optimization process. Operation 310 corresponding to the iterative optimization process may include an operation where the initial binocular disparity map calculator 111 estimates occlusion information based on a binocular disparity map when the binocular disparity map is provided, and an operation where the initial binocular disparity map calculator 111 estimates a binocular disparity map based on occlusion information when the occlusion information is provided.

First, an operation that estimates occlusion when a binocular disparity map is provided, will be described.

When a currently estimated binocular disparity map D is provided, an energy function $E_O$ may be defined by Equation 13. $E_O$ may be $E(D, O; I)$ of Equation 2.

$$E_O = \sum_x (1 - O_L(x))(1 + O_R(x))\rho_d(F(x, d_x; I_L, I_M)) + \quad \text{[Equation 13]}$$
$$\sum_x (1 - O_R(x))(1 + O_L(x))\rho_d(F(x, d_x; I_R, I_M)) +$$
$$\sum_x O_L(x)O_R(x)\eta + \sum_x \beta_\omega \begin{pmatrix} |O_L(x) - W_L(x; D)| + \\ |O_R(x) - W_R(x; D)| \end{pmatrix} +$$
$$\sum_{s,t} \beta_o(|O_L(s) - O_L(t)| + |O_R(s) - O_R(t)|)$$

Equation 13 may include two variables, that is, $O_L$ and $O_R$, and a quadratic term $O_L(x)O_R(x)$. Accordingly, a value of $E_O$ may not be readily obtained.

O and W may be defined by Equations 14 and 15, respectively.

$$O(p) = \begin{cases} 0, & O_L(p) = 0, O_R(p) = 0 \\ 1, & O_L(p) = 0, O_R(p) = 1 \\ 2, & O_L(p) = 1, O_R(p) = 0 \\ 3, & O_L(p) = 1, O_R(p) = 1 \end{cases} \quad \text{[Equation 14]}$$

-continued $$W(p) = \begin{cases} 0, & W_L(p) = 0, W_R(p) = 0 \\ 1, & W_L(p) = 0, W_R(p) = 1 \\ 2, & W_L(p) = 1, W_R(p) = 0 \\ 3, & W_L(p) = 1, W_R(p) = 1 \end{cases} \quad \text{[Equation 15]}$$

$E_O$ may be defined by Equation 16.

$$E_O = \sum_x (T(O(x) = 0)E_0(x; D) + T(O(x) = 1)E_1(x; D)) + \quad \text{[Equation 16]}$$
$$\sum_x (T(O(x) = 2)E_2(x; D) + T(O(x) = 3)E_3(x; D)) +$$
$$\sum_x \beta_\omega(\psi(O(x), W(x))) + \sum_{s,t} \beta_o(\psi(O(s), O(t)))$$

In Equation 16, $E_0$, $E_1$, $E_2$, and $E_3$ may be energy functions for four cases, respectively. T may be a test function that returns a value of 1 when test conditions are true. $\Psi(a,b)$ may be defined by Equation 17.

$$\Psi(a,b) = \text{Ceil}(|a-b|/2) \quad \text{[Equation 17]}$$

The initial binocular disparity map calculator 111 may obtain the value of $E_O$ through use of the BP algorithm or a fusion move algorithm.

Next, an operation that estimates a binocular disparity when occlusion information is provided will be described.

When a currently estimated occlusion O is provided, an energy function $E_D$ may be defined by Equation 18. $E_D$ may correspond to $E(D, O; I)$ of FIG. 2.

$$E_D = E_d(D; O, I) + \quad \text{[Equation 18]}$$
$$\sum_x \beta_w(O'_L(P_{M \to L}(x, D(x))) + O'_R(P_{M \to R}(x, D(x)))) +$$
$$\sum_{s,t} \lambda(s, t)\rho_s(D(s), D(t))$$

In Equation 18, $E_d(D; O, I)$ in a first term indicates a data cost.

A second term indicates a visibility term. $P_{M \to L}(x,D(x))$ indicates a projection function. $P_{M \to L}(x,D(x))$ may project a pixel x in a middle view on a left view based on a location and a binocular disparity value of the pixel x. $O_L'$ denotes occlusion information of the left view. The initial binocular disparity map calculator 111 may obtain $O_L'$ by warping all pixels in the middle view based on a previously calculated binocular disparity D. However, $O_L'$ is rough and thus, the initial binocular disparity map calculator 111 may smoothen $O_L'$ by applying a mean filter.

A third term denotes the smoothness term that is described in the foregoing.

The initial binocular disparity map calculator 111 may calculate a binocular disparity map D based on the BP algorithm.

In operation 320, the plane fitting applier 112 may apply a plane fitting to the calculated binocular disparity map D so as to enhance the binocular disparity map.

When segmentation fails to be completely performed in the plane fitting, the calculated binocular disparity map D may include a few errors. Accordingly, the plane fitting applier 112 may use different segmentation results to obtain varied types of results of the plane fitting. Also, the plane fitting applier 112 may fuse the results of the plane fitting and thus, may obtain a higher-quality binocular disparity map.

The plane fitting applier 112 may fuse results generated by applying different plane fittings to the binocular disparity map D of the middle view calculated in operation 310, so as to enhance the binocular disparity map of the middle view. The plane fitting applier 112 may fuse enhanced binocular disparity maps having different mean-shift parameters, so as to obtain a more accurate binocular disparity map. Through fusing, the plane fitting applier 112 may effectively enhance the initial binocular disparity map calculated in a previous stage, especially with respect to the texture-less regions.

When k different estimated binocular disparity maps, $\{D_1', D_2', \ldots, \text{and } D_k'\}$, exist and $D_i = \text{round}(D_i')$, k binocular disparity proposals, $\{D_1, D_2, \ldots, \text{and } D_k\}$, may exist. Accordingly, a binocular disparity value of each pixel, for example, a binocular disparity value of a pixel x, may have k candidates, $\{D_1(x), D_2(x), \ldots, \text{and } D_k(x)\}$. The plane fitting applier 112 may add $D_{k+1}(x) = \Sigma_i D_i(x)/k$ as a candidate for the binocular disparity value. After the addition, k+1 proposals, $\{D_1, D_2, \ldots, \text{and } D_{k+1}\}$, may exist.

An energy function E(D, O; I) may be defined by Equation 19.

$$E(D; O, I) = \sum_x \rho(x, d_x; O, I) + \sum_{s,t \in N} \lambda(s, t) \rho_s(d_s, d_t) \quad \text{[Equation 19]}$$

In Equation 19, s,t∈C indicates that a pixel s and a pixel t are adjacent to each other. λ(s,t) denotes an adaptive smoothness weight with respect to the pixel s and the pixel t.

Each pixel, for example, the pixel x, may have k+1 candidate binocular disparity values. Accordingly, estimating the binocular disparity map of each pixel, by the plane fitting applier 112, may correspond to a labeling problem including k+1 labels. The plane fitting applier 112 may use a mean-shift algorithm so as to generate different binocular disparity proposals. The plane fitting applier 112 may use a mean-shift algorithm in which different parameters are applied to the binocular disparity proposals. The parameters may be used for image segmentation.

In operation 330, the optical flow applier 113 may enhance the binocular disparity map D of the middle view based on information associated with an optical flow among one or more frames.

A dynamic object may exist in one or more scenes. Accordingly, a relationship between two points in two different frames may be measured by an optical flow of the two frames.

To calculate an optical flow from a $k^{th}$ frame to a $k+n^{th}$ frame, the optical flow applier 113 may use a method as described below.

An optical flow from a $k+i^{th}$ frame to a $k+i+1^{th}$ frame corresponds to $U_{k+i} = (u_{k+i}, v_{k+i})$, the optical flow from the $k^{th}$ frame to the $k+n^{th}$ frame may be $U_{k \to k+n} = \Sigma_{i=k}^{k+n-1} U_i$. The described method may be used for calculating a reverse optical flow from the $k+n^{th}$ frame to the $k^{th}$ frame.

In general, the optical flow is unreliable, especially with respect to occluded regions or disoccluded regions. Accordingly, to reduce artifacts included due to an optical flow error, the optical flow applier 113 may measure a reliability of an optical flow. When x corresponds to a pixel of the $k^{th}$ frame, the optical flow applier 113 may recognize a point y corresponding to x in the $k+n^{th}$ frame through use of an optical flow $U_{k \to k+n}$. Also, the optical flow applier 113 may use an optical flow $U_{k+n \to k}$, so as to map the point y to the $k^{th}$ frame. A point corresponding to the point y may be referred to as x'. When the optical flow is accurate, x and x' may be the same point. When the optical flow is inaccurate, x and x' may be distant from each other. Accordingly, the optical flow applier 113 may calculate a reliability ($P_{opt}$) of an optical flow based on Equation 20.

$$P_{opt} = \exp\left(-\frac{\|x - x'\|_2}{\sigma}\right) \quad \text{[Equation 20]}$$

In Equation 20, σ denotes a parameter to control a shape of $P_{opt}$.

The optical flow applier 113 may project, on the $k^{th}$ frame, a binocular disparity map of a $k-1^{th}$ frame and a binocular disparity map of the $k+1^{th}$ frame, using an optical flow.

Accordingly, the $k^{th}$ frame may have three binocular disparity maps, $\{D_{k_1}, D_{k_2}, D_{k_3}\}$. The optical flow applier 113 may calculate, with respect to the pixel x, that is, the pixel of the $k^{th}$ frame, a probability P(d|x) that a binocular disparity value of the pixel x is d, based on Equation 21.

$$P(d|x) = \sum_{i=1}^{3} \sum_{y \in W(x)} \exp(-\|d - D_{k_i}(y)\|_2^2 / T_1) \cdot P_{opt}^i(y)$$

$$\exp\left(-\left\|\begin{matrix} y - \\ x \end{matrix}\right\|_2^2 / T_2\right) \cdot$$

$$\frac{T_3}{T_3 + |I(x) - I(y)|} \cdot \frac{T_4}{T_4 + E_d(x, d | I, O)} \quad \text{[Equation 21]}$$

In Equation 21, W(x) may be a small window of which a center is x.

The optical flow applier 113 may calculate the binocular disparity value d of x based on Equation 22.

$$d = \arg\max P(d|x) \quad \text{[Equation 22]}$$

A result of temporal fusion may be described in FIG. 8. A few regions having erroneous depths may be corrected after temporal fusion.

Figure 4:
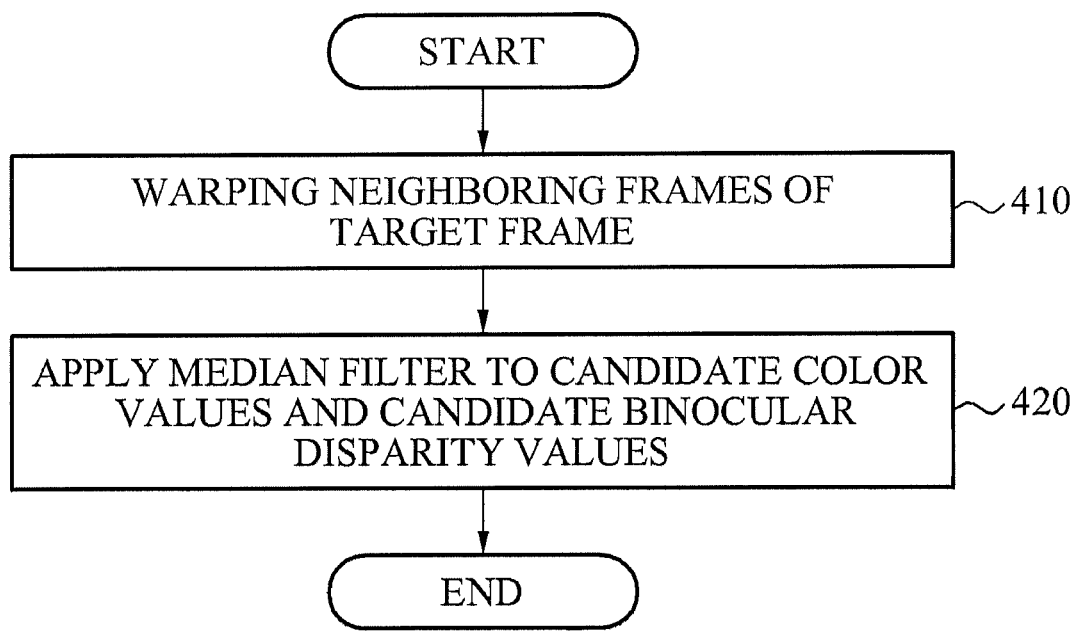
FIG. 4 illustrates a method of estimating a background view according to example embodiments.

FIG. 4 illustrates a method of estimating a background view according to example embodiments.

In operation 220 corresponding to estimation of a background view, background views corresponding to middle views may be estimated using binocular disparity maps or depth maps of middle views initialized in operation 210. A background view corresponding to a predetermined middle view may indicate a predetermined middle view. Operation 220 may include operations 410 and 420.

The background view estimator 120 may infer color information and depth information associated with a background of a middle view. The inferred color information and the inferred depth information may be used for obtaining a high-quality segmentation result. Here, the segmentation result may indicate a region detected as a moving object in a middle view.

The background view estimator 120 may use middle images of neighboring frames, of a predetermined frame, to generate a background view of a middle view of the predetermined frame. Here, neighboring frames of a $k^{th}$ frame may indicate a $k-k_1^{th}$ frame through a $k+k_2^{th}$ frame. Here, $k_1$ and $k_2$ may be natural numbers. That is, the neighboring frames of the predetermined frame may indicate temporally successive frames including the predetermined frame.

A background view may be generated for each frame. Hereinafter, a frame corresponding to a background view generated by the background view estimator 120 from among one or more frames may be referred to as a target frame.

A neighboring frame warping unit 121 may use middle views of neighboring frames of the target frame so as to generate a background view of the target frame. Accordingly, viewpoints of the middle views of the neighboring frames may be different from each other. Accordingly, the middle views of the neighboring frames may need to match the middle view of the target frame based on a location, a viewpoint, or the like.

In operation 410, the neighboring frame warping unit 121 may warp the middle views of the neighboring frames of the target frame so as to match the middle view of the target frame and thus, may generate candidate color values and candidate binocular disparity values of pixels in the middle view of the target frame. The neighboring frame warping unit 121 may warp the middle views of the neighboring frames to match the middle view of the target frame based on binocular disparity maps of the middle views of the neighboring frames.

Here, a candidate color value of a predetermined pixel may be a color value of a pixel in a warped middle view of a neighboring frame corresponding to the predetermined pixel. A candidate binocular disparity value may be a binocular disparity value of a pixel in the warped middle view of the neighboring frame corresponding to the predetermined pixel.

In operation 420, the median filtering unit 122 may infer a median of the generated candidate color values, as a most reliable background value from among the candidate color values. The median filtering unit 122 may apply a median filter to candidate color values and candidate binocular disparity values of the pixels in the middle view of the target frame, so as to generate an image and a binocular disparity map of a background view. For example, a median of candidate color values of a predetermined pixel may be a color value of the pixel. A median of candidate binocular disparity values of a predetermined pixel may be a binocular disparity value of the pixel.

Figure 5:
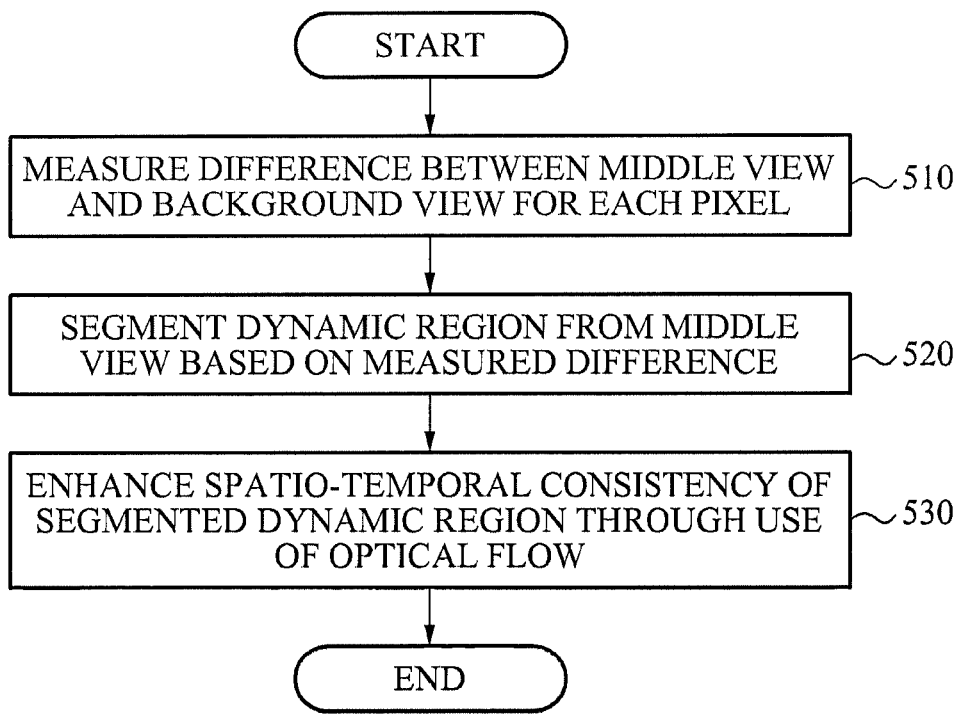
FIG. 5 illustrates a method of detecting a moving object according to example embodiments.

FIG. 5 illustrates a method of detecting a moving object according to example embodiments.

In operation 230 corresponding to detection of a moving object, a middle view and a background view of a frame may be compared for each pixel so as to detect the moving object from a middle view of a frame. Operation 230 may include operations 510, 520, and 530.

In operation 510, a difference measuring unit 131 may compare, for each pixel, a middle view and a background view of each of one or more frames so as to measure a difference in color $D_c(x)$, depth $D_d(x)$, and movement-depth $D_o(x)$ for each pixel.

The three types of differences to be used for measuring a probability that a pixel is included in a dynamic region will be defined below.

First, the difference measuring unit 131 may calculate a difference in color $D_c'(x)$ between a frame image I and an estimated background image $I_B$ based on Equation 23.

$$D_c'(x) = \frac{\|I(x) - I_B(x)\|_2}{\|I(x) - I_B(x)\|_2 + T} \quad \text{[Equation 23]}$$

In Equation 23, T denotes a parameter to control a shape of $D_c'(x)$. The difference measuring unit 131 may normalize $D_c'(x)$ to [0, 1]. When $D_{max}$ denotes a maximum value of $D_c'(x)$, the difference measuring unit 131 may calculate a normalized difference in color $D_c(x)$ between I and $I_B$, based on Equation 24.

$$D_c(x) = D_c'(x)/D_{max} \quad \text{[Equation 24]}$$

Second, the difference measuring unit 131 may calculate the difference in depth $D_d(x)$ between an initial depth and an estimated background depth, based on Equation 25.

$$D_d(x) = \min\{|D(x) - D_B(x)|, M\} \quad \text{[Equation 25]}$$

In Equation 25, M denotes a parameter of a minimum value of $D_d(x)$.

$D_d(x)$ may be modified to Equation 26.

$$D_d(x) = D_d(x)/\arg\max_d D_d(x) \quad \text{[Equation 26]}$$

Third, the difference measuring unit 131 may calculate a difference in movement-depth $D_o'(x)$ that measures a consistency of an initial depth and optical flow information, based on Equation 27.

$$D_o'(x) = \frac{1}{W} \sum_{i=-n}^{n} \left( P_{opt}^{k \to k+i}(x) \cdot \|x_o^{k \to k+i} - x_d^{k \to k+i}\|_2^2 \right) \quad \text{[Equation 27]}$$

In Equation 27, the difference measuring unit 131 may calculate W based on Equation 28.

$$W = \sum_{i=-n}^{n} P_{opt}^{k \to k+i}(x) \quad \text{[Equation 28]}$$

In Equation 28, $x_o^{k \to k+i}$ denotes a pixel in a k+$i^{th}$ frame, corresponding to x, based on optical flow information. $x_d^{k \to k+i}$ denotes a pixel in the k+$i^{th}$ frame, corresponding to x, based on depth information.

The difference measuring unit 131 may calculate the difference in movement-depth $D_o(x)$, based on Equation 29.

$$D_o(x) = \frac{D_o'(x)}{D_o'(x) + Q} \quad \text{[Equation 29]}$$

It is assumed that initial binocular disparity information associated with a few regions, having a high difference in depth ($D_d$), and a low difference in color ($D_c$) and movement-depth ($D_o$), has an error. Under this assumption, the difference measuring unit 131 may detect an error in a binocular disparity map by minimizing an energy function. The detection of the error may be formulated to a labeling problem. A labeling problem L may be defined by Equation 30.

$$L(X) = \begin{cases} 0, & \text{USE DIFFERENCE IN COLOR (DEPTH IS WRONG)} \\ 1, & \text{USE COMBINATION OF DIFFERENCES IN COLOR AND DEPTH} \end{cases} \quad \text{[Equation 30]}$$

An energy function E(L) may be defined by Equation 31.

$$E(L) = E_d(L) + \beta E_s(L) \quad \text{[Equation 31]}$$

A data term $E_d(L)$ may be defined by Equation 32.

$$E_d(L) = \sum_x \left( \frac{T_c(1 - L(x)) + D_d(x)}{\max(D_c(x), \lambda D_o(x)) + T_d} \cdot L(x) \right) \quad \text{[Equation 32]}$$

In Equation 32, $T_c$ denotes a threshold value, and $T_d$ denotes a parameter to control a probability of L(x)=1. $\lambda$ denotes a parameter to control a weight of a difference in movement-depth.

A smoothness term $E_s(L)$ may be defined by Equation 33.

$$E_s(L) = \sum_{s,t} \lambda(s,t) \rho_s(L(s), L(t)) \quad \text{[Equation 33]}$$

The difference measuring unit 131 may use a BP algorithm so as to minimize the energy function E(L).

The three types of difference maps and depth error regions will be described later with reference to FIG. 9.

The difference measuring unit 131 may calculate a weight for each of the difference in color, depth, and movement-depth, after segmentation of the depth error regions.

In operation 520, the dynamic region segmentation unit 132 may obtain a dynamic region(s) from middle view through segmentation, based on at least one of the difference in color $D_c(x)$, depth $D_d(x)$, and movement-depth $D_o(x)$ of each pixel in the middle views. The dynamic region obtained through the segmentation may correspond to a moving object.

The dynamic region segmentation unit 132 may define a function C(x) or a data term for dynamic region segmentation, based on Equation 34.

$$C(x) = \sum_x D_c(x)(1 - L(x)) + \frac{\max(D_c(x), D_d(x))}{1 + \exp(-(d(x) - M)/V)} \cdot L(x) \quad \text{[Equation 34]}$$

In Equation 34, V denotes a parameter to control a shape of C(x).

The dynamic region segmentation unit 132 may use the function C(x) that determines a value based on the difference in color $D_c(x)$, depth $D_d(x)$ of each pixel in the middle views, and may identify pixels included in the dynamic region from among the pixels in the middle views, based on the value output from the function. The dynamic region segmentation unit 132 may determine a pixel x as a pixel included in the dynamic region when the value of the function C(x) is within a designated range.

In operation 530, the optical flow applier 133 may enhance a result of the dynamic region segmentation through use of an optical flow among the frames. The optical flow applier 133 may enhance a spatio-temporal consistency among segmented dynamic regions, through use of information associated with the optical flow among the frames.

The optical flow applier 133 may project results of the segmentation from a $k^{th}$ frame to a $k+n^{th}$ frame, to the $k^{th}$ frame, and thus, may generate 2n+1 results with respect to the $k^{th}$ frame, $S_{k_1}, \ldots, S_{k_{2n+1}}$.

A probability P(l|x) that a result of segmentation with respect to the pixel x is I may be defined by Equations 35 and 36.

$$P'(d|x) = \sum_{i=1}^{2n+1} \sum_{y \in W(x)} \exp(-\|d - S_{k_i}(y)\|_2^2 / T_1) \cdot P_{opt}^i(y) \quad \text{[Equation 35]}$$

$$\exp(-\|y - x\|_2^2 / T_2) \cdot \frac{T_3}{T_3 + |I(x) - I(y)|}$$

$$P(l|x) = \frac{P'(l|x)}{(P'(l = 0|x) + P'(l = 1|x))} \quad \text{[Equation 36]}$$

P(l|x) may act as a prior distribution, and may be inserted to a data term $E_d'(S)$ as shown in Equation 37.

$$E_d'(S) = \quad \text{[Equation 37]}$$

$$\sum_x C(x)(1 - S(x)) + (1 - C(x))S(x) - \alpha \log(P(S(x)|x))$$

In Equation 37, α denotes a parameter to control a shape of $E_d'(S)$.

A smoothness term $E_s(L)$ may be defined by Equation 6 as described in the foregoing.

The optical flow applier 133 may minimize an energy function through use of the BP algorithm. After the energy function is minimized, the optical flow applier 133 may use a local segmentation method based on spatial information and temporal information, so as to enhance the result of the dynamic region segmentation.

The optical flow applier 133 may generate overlapped windows on a boundary. Here, the boundary denotes a boundary of a segmented dynamic region. The optical flow applier 133 may calculate a foreground Gaussian mixture model (GMM) and a background GMM within each window. The optical flow applier 133 may enhance the result of the dynamic region segmentation based on the foreground GMM and the background GMM.

When a distance between the pixel x and the boundary is greater than a threshold Q, a probability $P_B^c(x)$ that the pixel x is included in a foreground may be S(x). Also, when a probability $P_B^c(x)$ that the pixel x is included in a background may be $1 - P_F^c(x)$. When the distance between the pixel x and the boundary is less than or equal to the threshold Q, the pixel x may be regarded as being included within k local windows. Accordingly, the optical flow applier 133 may calculate a probability $P_F^{c'}(x)$ that the pixel x is included in a foreground, based on Equation 38.

$$P_F^{c'}(x) = \frac{1}{k} \sum_{i=1}^{k} \frac{P_i(I(x)|s = 1)}{P_i(I(x)|s = 0) + P_i(I(x)|s = 1)} \quad \text{[Equation 38]}$$

In Equation 38, $P_i(I(x)|s=1)$ may be a probability that the pixel x is included in the foreground, the probability being calculated through use of a foreground GMM of an $i^{th}$ local window. Similarly, the optical flow applier 133 may calculate a probability $P_B^{c'}(x)$ that the pixel x is included in the background, based on Equation 39.

$$P_B^{c'}(x) = \frac{1}{k} \sum_{i=1}^{k} \frac{P_i(I(x)|s = 0)}{P_i(I(x)|s = 0) + P_i(I(x)|s = 1)} \quad \text{[Equation 39]}$$

When $P_F^c(x)$ and $P_B^c(x)$ are defined by Equations 40 and 41, respectively, $P_F^c(x)$ and $P_B^c(x)$ may be regarded as prior distributions.

$$P_F^c(x) = P_F^{c'}(x)/(P_F^{c'}(x) + P_B^{c'}(x)) \quad \text{[Equation 40]}$$

$$P_B^c(x) = 1 - P_F^c(x) \quad \text{[Equation 41]}$$

Shape information that may be obtained from an initial result of the dynamic region segmentation may be useful to reduce segmentation errors. A number of foreground pixels in a small window of which a center is the pixel x is denoted by N, shape information $P_F^s(x)$ associated with the pixel x included in the foreground may be defined by Equation 42.

$$P_F^s(x) = \frac{N}{w^2} \quad \text{[Equation 42]}$$

In Equation 42, w denotes a width of a window. Also, shape information $P_B^c(x)$ associated with the pixel x included in the background may be defined by Equation 43.

$$P_B^s(x) = 1 - P_F^s(x) \quad \text{[Equation 43]}$$

Also, the optical flow applier 133 may use spatial information and temporal information so as to enhance the result of the dynamic region segmentation. The optical flow applier 133 may enhance a spatial and temporal consistency of the result of the dynamic region segmentation, based on Equation 36.

Spatial and temporal consistency information $P^t_F(x)$ associated with the pixel x included in the foreground may be defined by Equation 44.

$$P_F^t(x)=P(l=1|x) \quad \text{[Equation 44]}$$

Spatial and temporal consistency information $P_B^t(x)$ associated with the pixel x included in the background may be defined by Equation 45.

$$P_B^t(x)=P(l=0|x) \quad \text{[Equation 45]}$$

$P'_F(x)$ and $P'_B(x)$ obtained through combination of the three types of probabilities may be defined by Equations 46 and 47.

$$P_F'(x)=P_F^c(x) \cdot P_F^s(x) \cdot P_F^t(x) \quad \text{[Equation 46]}$$

$$P_B'(x)=P_B^c(x) \cdot P_B^s(x) \cdot P_B^t(x) \quad \text{[Equation 47]}$$

Accordingly, the optical flow applier 133 may calculate a probability $P_F(x)$ that the pixel x is included in the foreground, based on Equation 48.

$$P_F(x)=P_F'(x)/(P_F'(x)+P_B'(x)) \quad \text{[Equation 48]}$$

Also, the optical flow applier 133 may calculate a probability $P_B(x)$ that the pixel x is included in the background, based on Equation 49.

$$P_B(x)=1-P_F(x) \quad \text{[Equation 49]}$$

$P_F(x)$ and $P_B(x)$ may be added to a data term, as shown in Equation 50.

$$E_d(S) = \sum_x (-\log(P_F(x))(1-S(x)) - \log(P_B(x))S(x)) \quad \text{[Equation 50]}$$

A smoothness term $E_s(D)$ may be defined by Equation 6 described in the foregoing. The optical flow applier 133 may obtain a result of dynamic region segmentation based on the BP algorithm.

A segmented moving object will be described with reference to FIG. 10.

Figure 6:
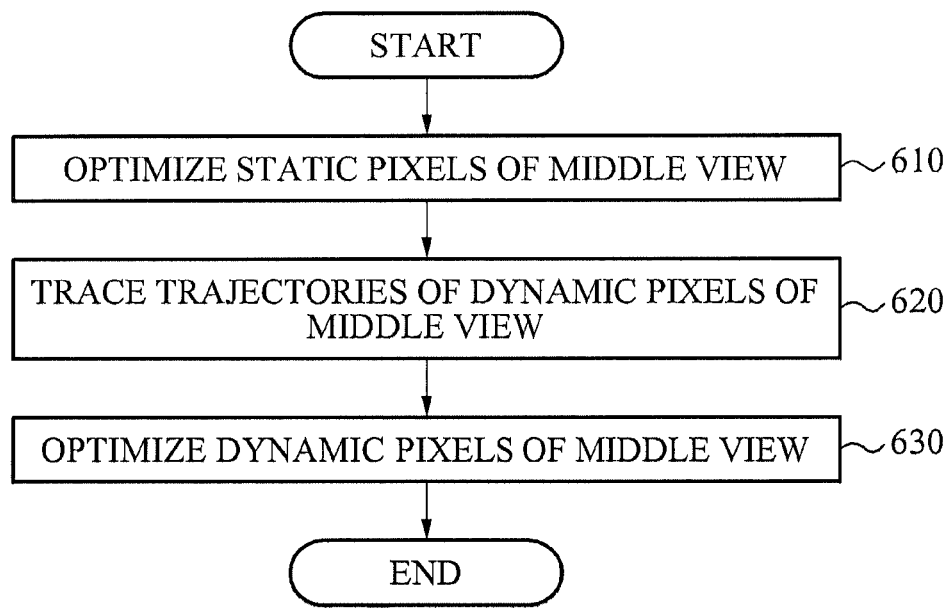
FIG. 6 illustrates a method of spatio-temporal stereo matching according to example embodiments.

FIG. 6 illustrates a method of spatio-temporal stereo matching according to example embodiments.

In operation 240 corresponding to spatio-temporal stereo matching, bundle optimization and temporal optimization may be applied to static pixels and dynamic pixels in a middle view. Operation 240 may include operations 610, 620, and 630.

In operation 610, the static pixel optimizer 141 may apply a bundle optimization model to the static pixels in the middle view so as to enhance binocular disparity values of the static pixels.

It is assumed that a trajectory of a dynamic pixel, over a short-time, may be approximated to a 3D line.

In operation 620, the trajectory tracer 142 may calculate 3D trajectories of dynamic pixels under this assumption, before enhancing the binocular disparity values of the dynamic pixels.

A line in the 3D space, hereinafter referred to as a line I, may be expressed by Equation 51.

$$l:x=x_0+tu \quad \text{[Equation 51]}$$

In Equation 51, $x_o$ denotes a point on the line l, and u denotes a direction vector. When x is assumed to be a two-dimensional (2D) point in a $k^{th}$ frame, locations corresponding to x in neighboring frames may be regarded as a trajectory of x. $\{x_1', x_2', \ldots, $ and $x_n'\}$ denotes locations of x in different frames. The trajectory tracer 142 may map the locations to 3D points, $\{x_1, x_2, \ldots, $ and $x_n\}$, based on camera parameters and estimated depth maps. Subsequently, the trajectory tracer 142 may calculate linear trajectories of dynamic pixels based on a principal component analysis (PCA).

In operation 630, the dynamic pixel optimizer 143 may enhance the binocular disparity values of dynamic pixels by applying, to the dynamic pixels, temporal optimization and bundle optimization which use the trajectories of the dynamic pixels.

The dynamic pixel optimizer 143 may calculate a mean value u of n points, $\{x_1, x_2, \ldots, $ and $x_n\}$, generated by mapping, based on Equation 52.

$$u=\Sigma_{k=1}^n x_k/n \quad \text{[Equation 52]}$$

The dynamic pixel optimizer 143 may calculate a covariance matrix S based on Equation 53.

$$S=\Sigma_{k=1}^n (x_k-u)(x_k-u)^T/n \quad \text{[Equation 53]}$$

S denotes a symmetric matrix. Accordingly, S may be decomposed as shown in Equation 54.

$$S=Q\Sigma Q^T \quad \text{[Equation 54]}$$

In Equation 54, Q denotes an orthogonal matrix, and $\Sigma$ denotes a diagonal matrix.

When $\lambda_1$ denotes a first largest eigenvalue of S, and $\lambda_2$ denotes a second largest eigenvalue of S, a parameter $\alpha$, defined by Equation 55, may indicate whether a trajectory of a point is described by a line.

$$\alpha=\lambda_1/\lambda_2 \quad \text{[Equation 55]}$$

When $\alpha$ is greater than an eigenvector C associated with an eigenvalue, an assumption that a trajectory of a point is described by a line may be reasonable. When $\alpha$ is less than an eigenvector C, the assumption may be invalid.

In the first instance, under an assumption that a binocular disparity value of x is d, a probability that a binocular disparity of x is d may be low when a distance between a trajectory line and a 3D point to which x is mapped under d is long. The probability that x is d may be high when the distance between the trajectory line and the 3D point to which x is mapped under d is short. Accordingly, to perform modeling of P(d|x) that a binocular disparity of x is d, a distance between a point and a line in a 3D space may be used.

The dynamic pixel optimizer 143 may calculate P(d|x) based on Equation 56.

$$P(d|x) = \exp\left(-\frac{Q(d|x)^2}{v(x)^2 \cdot \sigma_p}\right) \quad \text{[Equation 56]}$$

In Equation 56, Q(d|x) denotes a distance between a point and a line. v(x) may be defined by Equation 57. $\sigma_p$ may be a parameter to control a shape of P(d|x).

$$v(x)=\min_d Q(d|x) \quad \text{[Equation 57]}$$

In the second instance, the dynamic pixel optimizer 143 may map, to the $k^{th}$ frame, binocular disparity maps of a $k-1^{th}$ frame and a $k+1^{th}$ frame, using an optical flow among frames. The $k^{th}$ frame may have three binocular disparity maps, $\{D_{k_1}, D_{k_2}, D_{k_3}\}$, through the mapping. With respect to the pixel x in the $k^{th}$ frame, the dynamic pixel optimizer 143 may calculate a probability P(d|x) that a binocular disparity value of the pixel x is d, based on Equation 58.

$$P(d \mid x) = \sum_{i=1}^{3} \sum_{y \in W(x)} \exp(-\|d - D_{k_i}(y)\|_2^2 / T_1) \cdot P_{opt}^i$$

$$(y) \exp(-\|y - x\|_2^2 / T_2) \cdot \frac{T_3}{T_3 + |I(x) - I(y)|}$$

[Equation 58]

In Equation 58, W(x) denotes a small window of which a center is x. In Equation 58, a first term indicates a similarity between d and an initial binocular disparity value $D_k(y)$. A second term $P_{opt}^i(y)$ may indicate a reliability of an optical flow for a $K_i^{th}$ frame. A third term may measure a weight of information associated with a pixel y. A fourth term may be similar to the smoothness term $E_S(D)$ of Equation 6.

The dynamic pixel optimizer 143 may calculate a binocular disparity likelihood P(d|C) based on Equation 59, so as to combine a bundle optimization model and a local 3D line model.

$$P(d \mid C) = \sum_{z=0,1} P(d, z \mid C)$$

$$= \sum_{z=0,1} P(d \mid z, C) P(z \mid C)$$

$$= \sum_{z=0,1} P(d \mid z, C) \frac{P(C \mid z) P(z)}{\sum_{z=0,1} P(C \mid z) P(z)}$$

[Equation 59]

In Equation 59, C denotes a color value of the pixel x. The location of the pixel x may be disregarded in Equation 59 for clarity. A value of z being zero may indicate that the pixel x is included in a static background. A value of z being 1 may indicate that the pixel x is included in a dynamic background When a distance between the pixel x and a segmentation boundary is greater than a threshold Q, a probability P(C|z=1) that the pixel x is included in a foreground may be defined by Equation 60.

$$P(C \mid z=1) = S(x)$$ [Equation 60]

When the distance between the pixel x and the segmentation boundary is greater than the threshold Q, a probability P(C|z=0) that the pixel x is included in a background may be defined by Equation 61.

$$P(C \mid z=0) = 1 - P(C \mid z=1)$$ [Equation 61]

When the distance between the pixel x and the segmentation boundary is less than or equal to Q, the dynamic pixel optimizer 143 may obtain P(C|z) based on a foreground GMM and a background GMM calculated in local windows.

The dynamic pixel optimizer 143 may calculate P(z) by following three steps.

In the first step, the dynamic pixel optimizer 143 may calculate $P_d(z=1)$ and $P_d(z=0)$ based on Equations 62 and 63, through use of a distance d between the pixel x and the segmentation boundary.

$$P_d(z=1) = \exp(-d^2 / \sigma_d)$$ [Equation 62]

$$P_d(z=0) = 1 - P_d(z=1)$$ [Equation 63]

In the second step, shape information $P_s(z)$ may be defined to be the same as $P_F^s(x)$ of Equation 42.

In the third step, a spatial and temporal consistency $P_t(z)$ may be defined to be the same as P(1|x) of Equation 36.

By following the described steps, the dynamic pixel optimizer 143 may calculate P(z) based on Equation 64.

$$P(z) = P_d(z) \cdot P_s(z) \cdot P_t(z)$$ [Equation 64]

P(d|z=1,C) may be defined the be the same as P(d|x) of Equation 56 or Equation 58. A geometric coherence P(d|z=0, C) in a binocular disparity space may be defined to be similar to P(d|z=1,C), through use of a geometric coherence term $P_v$ in the bundle optimization algorithm. A phenomenon of corresponding pixels in different frames having the same 3D location may be intuitive. A minor difference is that an original bundle optimization model measures a geometric coherence in an image space.

The dynamic pixel optimizer 143 may measure a geometric coherence P(d|z=0,C) in a binocular disparity space, based on Equation 65.

$$P(d \mid z=0, C) = \exp\left(-\frac{\|h(d) - d_{x'}\|^2}{2\sigma_v^2}\right)$$ [Equation 65]

In Equation 65, x' denotes a projected pixel in a matching frame i'. $d_x$ denotes an estimated binocular disparity value of x'. h(d) denotes a binocular disparity value that is transformed based on camera parameters. [R|t] denotes a projective matrix from a frame i to a frame i'. $K_i$ denotes an intrinsic matrix of the frame i. A 2D location of x may be (u, v).

The dynamic pixel optimizer 143 may calculate h(d) based on Equation 66.

$$h(d) = \frac{1}{(RK_i^{-1}(u, v, 1/d)^T + t)[3]}$$ [Equation 66]

In Equation 66, [3] denotes a third element of a vector.

The dynamic pixel optimizer 143 may calculate a data term $E_{d_1}(D, O; I)$ of dynamic regions based on Equation 67, by adding P(d|C) to the data term $E_d$ defined by Equation 3

$$E_{d_1}(D, O; I) = E_d(D, O; I) + \lambda \sum_x (-\log P(D(x) \mid I(x)))$$ [Equation 67]

Equation 67 may be applicable to a dynamic region. The static pixel optimizer 141 may use a bundle optimization data term $E_{d_2}(D, O; I)$ with respect to static backgrounds.

$E_{d_1}(D, O; I)$ and $E_{d_2}(D, O; I)$ may be combined as shown in Equation 68.

$$E_d^c(D, O; I) = \sum_x \left( \begin{array}{c} E_{d_1}(D(x), O; I) \cdot P(z=1 \mid x, I(x)) + \\ E_{d_2}(D(x), O; I) \cdot P(z=0 \mid x, I(x)) \end{array} \right)$$ [Equation 68]

A smoothness term $E_d^c$ may be defined to be the same as $E_s(D)$ of Equation 6.

To obtain final results, the spatio-temporal stereo matcher 140 may solve an energy function based on a BP algorithm.

A binocular disparity map enhanced after spatio-temporal optimization will be described with reference to FIG. 11.

Figure 7:
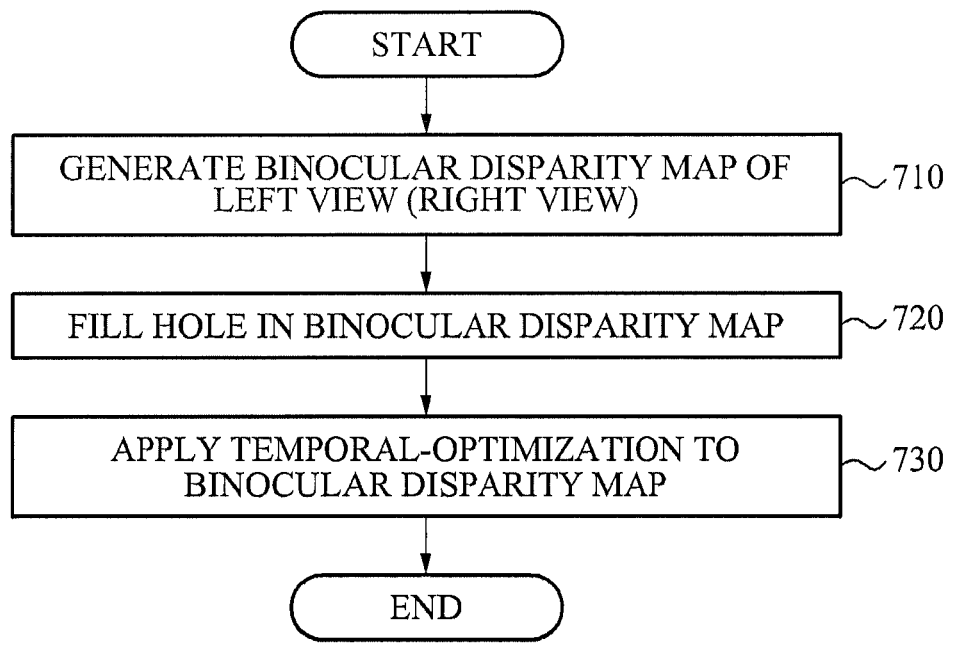
FIG. 7 illustrates a method of generating a left-right binocular disparity map according to example embodiments.

FIG. 7 illustrates a method of generating a left-right binocular disparity map according to example embodiments.

In addition to recovery of binocular disparity maps of middle views, binocular disparity maps of a left view and a right view may need to be estimated.

Operation 250 may include operations 710, 720, and 730.

In operation 710, a left-right binocular disparity map initializing unit 151 may warp middle views of one or more frames so as to generate initial binocular disparity maps of left views and initial binocular disparity maps of right views of the frames.

The left-right binocular disparity map initializing unit 151 may warp a mask of an estimated moving object and a binocular disparity map of each frame in a middle view to a left view and a right view. The warped binocular disparity map may have a hole created by a missing pixel resulting from occlusion in the middle view.

In operation 720, the segmentation-based hole filling unit 152 may infer depths of the missing pixels based on a segmentation-based method so as to fill the holes in the binocular disparity maps of the left views and the binocular disparity maps of the right views.

The segmentation-based hole filling unit 152 may combine segmentation information generated by segmenting moving objects so as to infer binocular disparity values of the missing pixels. In general, most missing pixels exist in static regions.

The segmentation-based hole filling unit 12 may use a mean-shift algorithm so as to segment a left image and a right image. When a segment includes both static pixels and dynamic pixels, the segmentation-based hole filing unit 152 may perform further segmentation.

Under an assumption that a 3D surface of each segment may be approximated to a 3D plane, the segmentation-based hole filling unit 152 may perform plane fitting with respect to each segment having missing pixels. The segmentation-based hole filling unit 152 may use plane fitting with respect to each segment, so as to infer the binocular disparity values with respect to the missing pixels.

A few segments in occlusion regions may be mistakenly fitted since pixels having accurate depths may be insufficient. The spatio-temporal optimization method, as described in the foregoing, may be introduced so as to enhance a left binocular disparity map and a right binocular disparity map.

In operation 730, the left-right binocular disparity map spatio-temporal optimizing unit 153 may apply spatio-temporal optimization to the binocular disparity maps of the left views and the binocular disparity maps of the right views.

FIG. 8 illustrates a result of temporal fusion according to example embodiments.

A first image 810 may correspond to a binocular disparity map estimated before temporal fusion. A second image 820 may correspond to a binocular disparity map estimated after temporal fusion.

Figure 9:
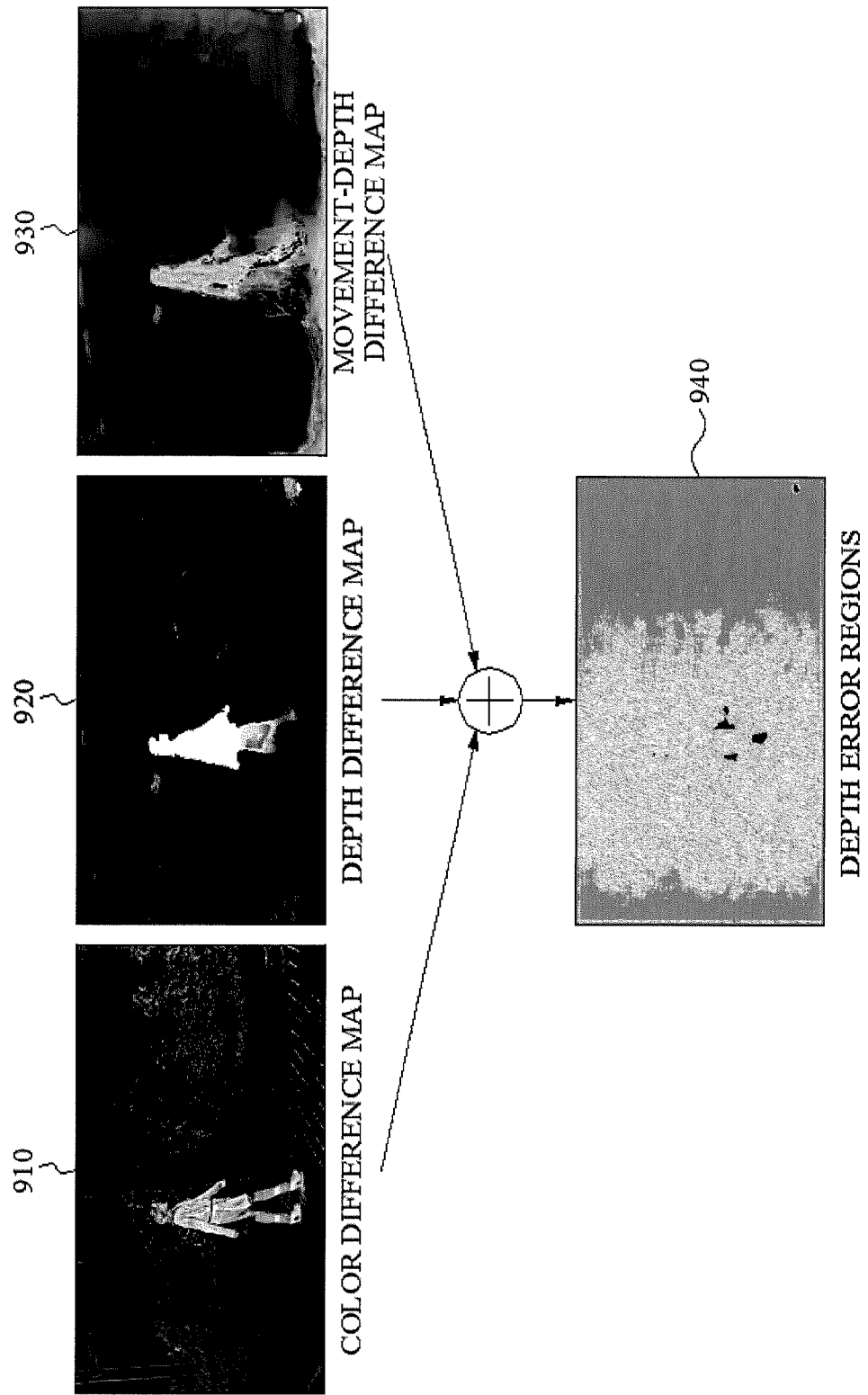
FIG. 9 illustrates three types of difference maps and depth error regions according to example embodiments.

FIG. 9 illustrates three types of difference maps and depth error regions according to example embodiments.

A first image 910 may correspond to a color difference map. A second image 920 may correspond to a depth difference map. A third image 930 may correspond to a movement-depth difference map. A fourth image 940 may correspond to an image indicating depth error regions, generated based on the color difference map, the depth difference map, and the movement-depth difference map.

FIG. 10 illustrates a segmented moving object from a view according to example embodiments.

A first image 1010 may correspond to an image of a view. A second image 1020 may include a background and a moving object detected from the view through segmentation. A portion expressed in black in the second image 1020 may correspond to the background. A portion expressed in white in the second image 1020 may correspond to the moving object detected through segmentation.

Figure 11:
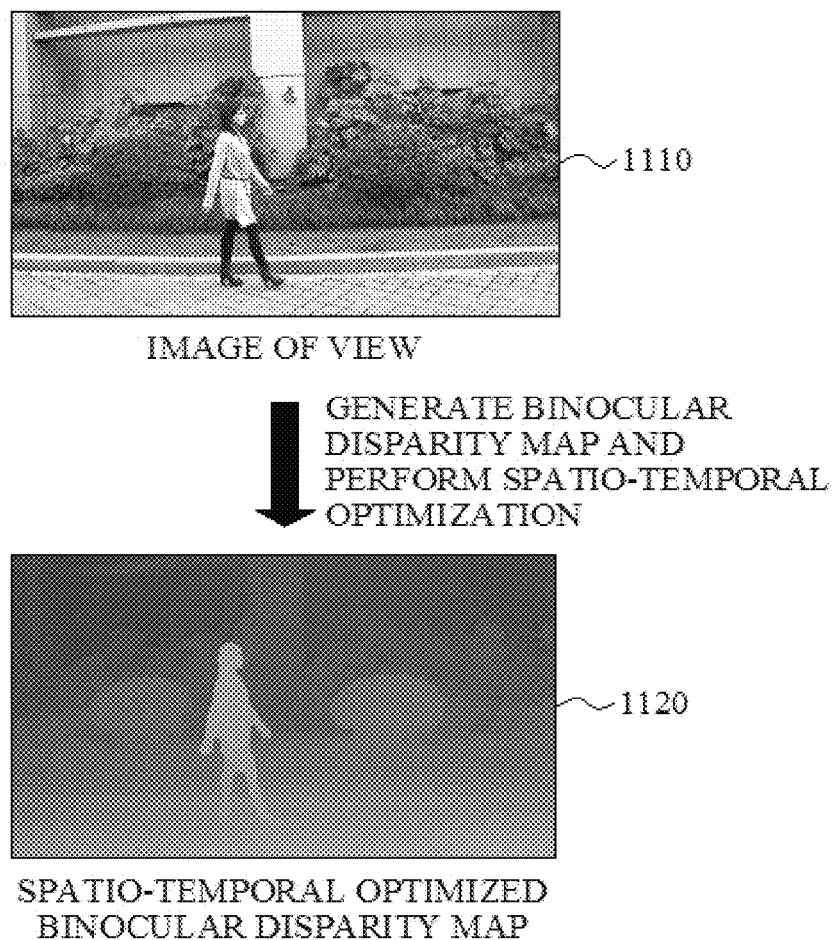
FIG. 11 illustrates an enhanced binocular disparity map after spatio-temporal optimization is performed, according to example embodiments.

FIG. 11 illustrates an enhanced binocular disparity map after spatio-temporal optimization is performed according to example embodiments.

A first image 1110 may correspond to an image of a view. A second image 1120 may be a binocular disparity map enhanced through the spatio-temporal optimization.

The apparatus and method for recovering depth information of an image according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but is not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although example embodiments have been shown and described, it would be appreciated by those skilled in the art that changes may be made to these embodiments without departing from the principles and spirit of the disclosure, the scope of which is defined by the claims and their equivalents.

What is claimed is:

1. A method of processing an image, the method comprising:

estimating a binocular disparity map of a middle view among a plurality of views for each of one or more frames using a left image, a middle image, and a right image included in each of the frames, the middle view including the middle image and the estimated binocular disparity map;

estimating background views indicating backgrounds of the middle views using depth maps of the middle views of the one or more frames; and detecting a moving object in the middle views, based on differences between the middle views and the background views.

2. The method of claim 1, wherein at least one of the left image and the right image corresponds to a plurality of images.

3. The method of claim 1, wherein the estimating of the binocular disparity map comprises:

calculating the binocular disparity map of the middle view by repeatedly minimizing a value of an energy function using a back propagation (BP) algorithm, the value of the energy function being determined based on occlusion information associated with the middle view and the binocular disparity map of the middle view when the left image, the middle image, and the right image are provided; and enhancing the binocular disparity map of the middle view by fusing results obtained by applying different plane fittings to the binocular disparity map of the middle view.

4. The method of claim 3, wherein the calculating comprises:

estimating the occlusion information based on the binocular disparity map of the middle view; and estimating the binocular disparity map of the middle view based on the occlusion information.

5. The method of claim 3, further comprising:

enhancing the binocular disparity map of the middle view using information associated with an optical flow among the one or more frames.

6. The method of claim 1, wherein the estimating of the background views comprises:

warping middle views of neighboring frames of a target frame from among the one or more frames to match a middle view of the target frame, to generate candidate binocular disparity values and candidate color values of pixels included in the middle view of the target frame; and applying a median filter to the candidate binocular disparity values and the candidate color values of the pixels, to generate an image and a binocular disparity map of a background view of the target frame.

7. The method of claim 1, wherein the detecting of the moving object comprises:

comparing, for each pixel, the middle view and the background view of each of the one or more frames to measure a difference in color, depth, and movement-depth of each pixel included in the middle views; and segmenting dynamic regions from the middle views, based on at least one of the difference in color, depth, and movement-depth of each pixel included in the middle views, wherein the segmented dynamic regions correspond to the moving object.

8. The method of claim 7, wherein the detecting further comprises:

enhancing a spatio-temporal consistency among the segmented dynamic regions using information associated with an optical flow among the one or more frames.

9. The method of claim 1, further comprising:

applying, to the middle views of the one or more frames, bundle optimization and local three-dimensional (3D) line model-based temporal optimization to enhance binocular disparity values of static pixels and dynamic pixels included in the middle views, wherein the dynamic pixels correspond to pixels corresponding to the moving object and the static pixels correspond to pixels that fail to correspond to the moving object.

10. The method of claim 1, further comprising:

generating binocular disparity maps of left views of the one or more frames and binocular disparity maps of right views of the one or more frames by warping the middle views of the one or more frames;

filling holes included in the binocular disparity maps of the left views and the binocular disparity maps of the right views, based on segmentation; and applying spatio-temporal optimization to the binocular disparity maps of the left views and the binocular disparity maps of the right views, wherein the holes correspond to missing pixels resulting from occlusion in the middle views.

11. A non-transitory computer-readable medium comprising a program for instructing a computer to perform the method of claim 1.

12. An apparatus for processing an image, the apparatus comprising:

a binocular disparity map estimator to estimate a binocular disparity map of a middle view among a plurality of views for each of one or more frames using a left image, a middle image, and a right image included in each of the frames, the middle view including the middle image and the estimated binocular disparity map;

a background view estimator to estimate background views indicating backgrounds of the middle views using depth maps of the middle views of the one or more frames; and a moving object detector to detect a moving object in the middle views, based on differences between the middle views and the background views.

13. The apparatus of claim 12, wherein the binocular disparity map estimator comprises:

an initial binocular disparity map calculator to calculate the binocular disparity map of the middle view by repeatedly minimizing a value of an energy function using a back propagation (BP) algorithm, the value of the energy function being determined based on the binocular disparity map of the middle view and occlusion information associated with the middle view when the left image, the middle image, and the right image are provided, and a plane fitting applier to enhance the binocular disparity map of the middle view by fusing results obtained by applying different plane fittings to the binocular disparity map of the middle view.

14. The apparatus of claim 13, wherein the initial binocular disparity map calculator estimates the occlusion information based on the binocular disparity map of the middle view, and estimates the binocular disparity map of the middle view based on the occlusion information.

15. The apparatus of claim 13, further comprising:

a first optical flow applier to enhance the binocular disparity map of the middle view using information associated with an optical flow among the one or more frames.

16. The apparatus of claim 12, wherein the background view estimator comprises:

a neighboring frame warping unit to warp middle views of neighboring frames of a target frame from among the one or more frames to match a middle view of the target frame, to generate candidate binocular disparity values and candidate color values of pixels included in the middle view of the target frame; and a median filtering unit to apply a median filter to the candidate binocular disparity values and the candidate color values of the pixels, to generate an image and a binocular disparity map of a background view of the target frame.

17. The apparatus of claim 12, wherein the moving object detector comprises:
- a difference measuring unit to compare, for each pixel, the middle view and the background view of each of the one or more frames to measure a difference in color, depth, and movement-depth of each pixel included in the middle views; and
- a dynamic region segmentation unit to segment dynamic regions from the middle views, based on at least one of the difference in color, depth, and movement-depth of each pixel included in the middle views,
- wherein the segmented dynamic regions correspond to the moving object.

18. The apparatus of claim 17, wherein the moving object detector further comprises:
- a second optical flow applier to enhance a spatio-temporal consistency among the segmented dynamic regions using information associated with an optical flow among the one or more frames.

19. The apparatus of claim 12, further comprising:
- a spatio-temporal stereo matcher to apply, to the middle views of the one or more frames, bundle optimization and local three-dimensional (3D) line model-based temporal optimization to enhance binocular disparity values of static pixels and dynamic pixels included in the middle views,
- wherein the dynamic pixels correspond to pixels corresponding to the moving object and the static pixels correspond to pixels that do not correspond to the moving object.

20. The apparatus of claim 12, further comprising:
- a left-right binocular disparity map initializing unit to generate binocular disparity maps of left views of the one or more frames and binocular disparity maps of right views of the one or more frames by warping the middle views of the one or more frames;
- a segmentation-based hole filling unit to fill holes included in the binocular disparity maps of the left views and the binocular disparity maps of the right views, based on segmentation; and
- a left-right binocular disparity map spatio-temporal optimizer to apply spatio-temporal optimization to the binocular disparity maps of the left views and the binocular disparity maps of the right views,
- wherein the holes correspond to missing pixels resulting from occlusion in the middle views.

21. A method of processing an image, the method comprising:
- estimating a binocular disparity map of a middle view for each of one or more frames using a left image, a middle image, and a right image included in each of the frames;
- estimating background views of the middle views using depth maps of the middle views of the one or more frames;
- detecting a moving object in the middle views, based on differences between the middle views and the background views; and
- calculating a binocular disparity map of the middle view using an iterative optimization process to minimize a value of an energy function using a back propagation algorithm,
- wherein the value of the energy function is determined based on occlusion information associated with the middle view.

22. The method of claim 21, wherein the detecting further comprises:
- comparing, for each pixel, a middle view and a background view of the one or more frames and measuring a difference in color, depth, and movement-depth for each pixel; and
- segmenting the middle view to obtain one or more segmented dynamic regions based on at least one of the measured differences of the color, depth, and movement-depth.

23. The method of claim 22, wherein the detecting further comprises:
- calculating a foreground Gaussian mixture model and a background Gaussian mixture model for one or more boundaries of the segmented dynamic regions.

* * * * *